United States Patent [19]

Hosotani

[11] Patent Number: 5,701,506
[45] Date of Patent: Dec. 23, 1997

[54] MICROCOMPUTER HAVING ROM PROGRAM WHICH CAN BE ALTERED

[75] Inventor: Osamu Hosotani, Itami, Japan

[73] Assignee: Mitsubishi Denki Kabushiki Kaisha, Tokyo, Japan

[21] Appl. No.: 452,612

[22] Filed: May 25, 1995

[30] Foreign Application Priority Data

May 31, 1994 [JP] Japan ................... 6-118250

[51] Int. Cl.$^6$ ................................................. G06F 9/00
[52] U.S. Cl. ................... 395/800; 395/497.01; 395/375; 395/182.03; 364/232.8; 364/245; 364/261.3; 364/268.5; 364/DIG. 1
[58] Field of Search ....................... 395/800, 828, 395/835, 846, 856, 871, 490, 497.01, 412, 421.03, 182.03, 650, 700, 726, 375, 500; 371/2.2, 11.1, 11.3, 12; 380/3, 4; 365/230.01, 189.01

[56] References Cited

U.S. PATENT DOCUMENTS

| | | | |
|---|---|---|---|
| 4,434,464 | 2/1984 | Suzuki et al. | 395/491 |
| 4,573,119 | 2/1986 | Westheimer et al. | 380/4 |
| 5,021,951 | 6/1991 | Baba | 395/411 |
| 5,155,829 | 10/1992 | Koo | 395/490 |
| 5,305,460 | 4/1994 | Kaneko et al. | 395/775 |
| 5,325,499 | 6/1994 | Kummer et al. | 395/470 |
| 5,448,744 | 9/1995 | Eifert et al. | 395/800 |
| 5,454,100 | 9/1995 | Sagane | 395/182.06 |

Primary Examiner—Alpesh M. Shah
Attorney, Agent, or Firm—Lowe, Price, LeBlanc & Becker

[57] ABSTRACT

A microcomputer whose ROM program can be altered without the necessity of rebuilding or remaking the ROM, wherein when an address outputted from a CPU to an address bus matches one of the addresses of locations at which the ROM program is to be altered, the ROM is disconnected from a data bus and a jump instruction op code is outputted to the data bus, followed by the start address of an altered contents stored in a RAM or the start address of an instruction for locating among a plurality of altered contents, the start address of the altered content that is substituted for the portion of the program to be altered; then, the CPU reads the jump instruction op code and the start address, the operand of the jump instruction, outputted on the data bus, and executes the jump instruction by which a jump occurs from the ROM program to the altered contents stored in the RAM to execute the altered contents, and control returns to the ROM program after the execution of each altered content, thereby altering the ROM program at a plurality of portions thereof.

8 Claims, 12 Drawing Sheets

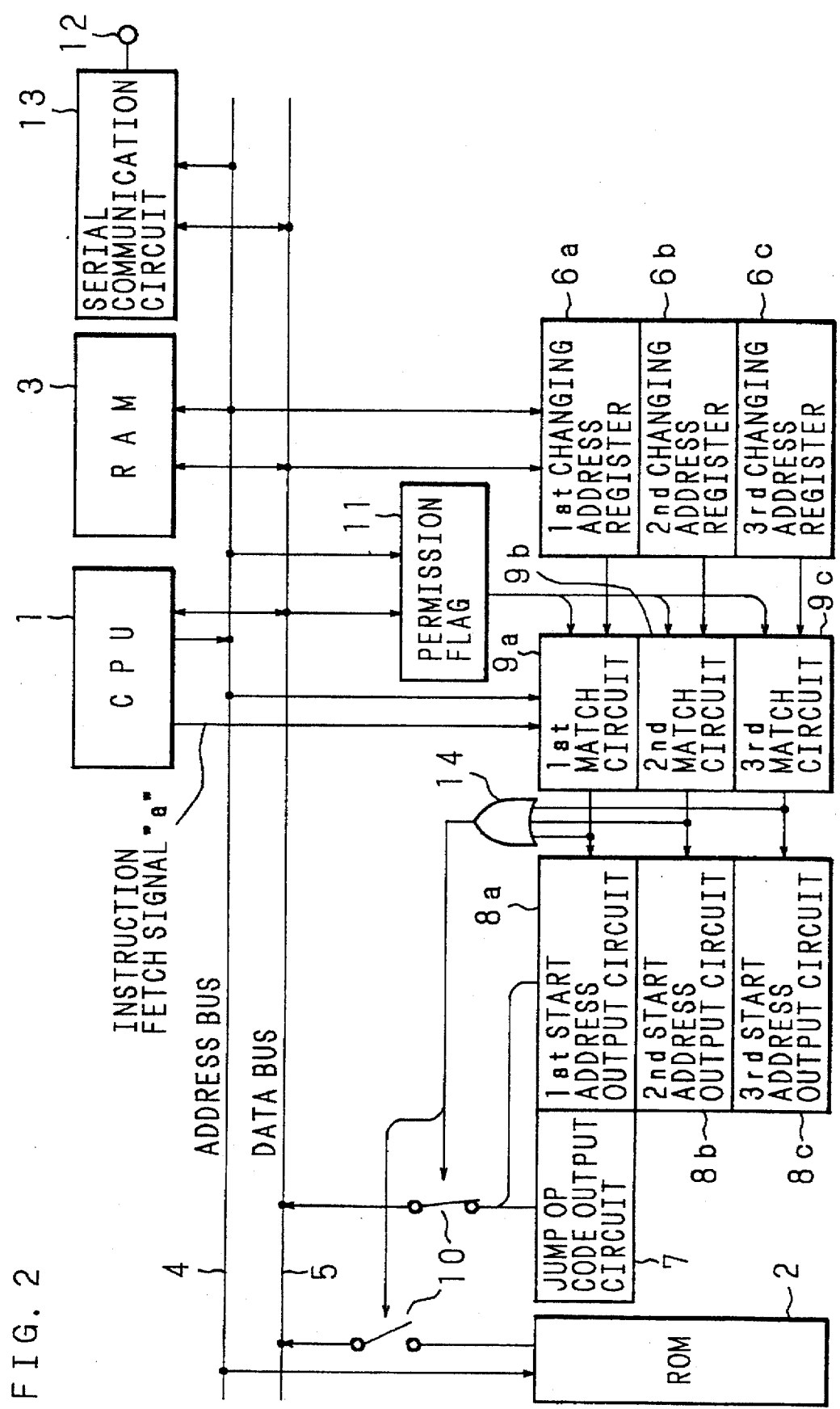

FIG. 9

| ADDRESS | CORRECTION PROGRAM (RAM) |
|---|---|
| $Z_0$ | READ MATCH CAUSE FLAG |
| | $Z_1$ |
| | $Z_2$ |
| | $Z_3$ |
| $Z_1$ | 1st CORRECTION PROGRAM |
| | JUMP OP CODE |
| | $Y_1+1$ |
| $Z_2$ | 2nd CORRECTION PROGRAM |
| | JUMP OP CODE |
| | $Y_2+1$ |
| $Z_3$ | 3rd CORRECTION PROGRAM |
| | JUMP OP CODE |
| | $Y_3+1$ |

MICROCOMPUTER HAVING ROM PROGRAM WHICH CAN BE ALTERED

BACKGROUND OF THE INVENTION

1. Field of the Invention

The present invention relates generally to a microcomputer, and more particularly to a microcomputer where a program written in the ROM can be changed or altered because of a bug or the like without the necessity of rebuilding or remaking the ROM.

2. Description of the Related Art

FIG. 1 is a block diagram showing the configuration of a prior art microcomputer. A CPU 1 reads and executes a program written in a mask ROM 2, performs operations using the data stored in a RAM 3 during the execution of the program, and stores the results of the operations in the RAM 3. The CPU 1 outputs an address on an address bus 4, and reads data via a data bus 5 from the ROM 2 or RAM 3 whichever designated by the address or writes data via the data bus 5 into the RAM 3 accessed by the address outputted on the address bus 4.

There are various methods of writing a program in a mask ROM. By one method, memory cells are formed only at locations where 1s are stored during the fabrication process of the integrated circuit. By another method, 1s and 0s are stored respectively using different types of transistors (enhancement type and depletion type). As a result, unlike an EPROM, EEPROM, etc. in which the stored contents are alterable by ultraviolet radiation or by electrical means after manufacture, the programs written in a mask ROM cannot be altered once the ROM has been built in the microcomputer, and if there arises a need to alter the program because of a software bug or the like, the mask ROM must be rebuilt or remade, thereby reducing the productivity of microcomputers. In the case of a one-chip microcomputer in which a CPU, ROM, RAM, and the necessary peripheral circuitry are fabricated on a single chip through several steps of wafer fabrication, the alteration of a ROM program requires the remaking of the microcomputer itself, which further reduces the productivity of microcomputers.

SUMMARY OF THE INVENTION

Accordingly, the present invention is directed to solve the above problems, and it is a primary object of the invention to provide a microcomputer having a ROM program alterability by which a program written in a ROM can be corrected at a plurality of portions thereof without remaking the ROM.

It is another object of the invention to provide a microcomputer having a ROM program alterability, in which a flag value is referenced that indicates which of a plurality of portions to be altered matches an address outputted on an address bus, and a branch is caused by software to an altered content in a RAM corresponding to the portion indicated by the flag value, thereby allowing the use of the same circuit configuration regardless of the number of portions to be altered, and at the same time, providing increased flexibility in altered content mapping to the RAM.

It is a further object of the invention to provide a microcomputer having a ROM program alterability, in which by storing in write enable registers the start addresses of altered contents for altering a plurality of portions of a ROM program, the altered contents can be mapped to convenient addresses in a RAM in flexible manner, thus making efficient use of RAM space.

It is still another object of the invention to provide a microcomputer having a ROM program alterability, that is made simple in circuit configuration and compact in construction by making provision to store the start addresses and jump op code in a ROM.

It is yet another object of the invention to provide a microcomputer having a ROM program alterability, in which a flag for permitting/prohibiting the alteration of a ROM program is switched by software, eliminating the need for reconfiguring the system when a ROM in which the stored program does not need correction is mounted, and also facilitating the initial setting procedure in such a case.

The above and further objects and features of the invention will more fully be apparent from the following detailed description with accompanying drawings.

According to one aspect of the invention, there is provided a microcomputer in which a CPU outputs an address to an address bus, reads program data via a data bus from a memory of said address, and executes a program, including a ROM for storing said program executed by the CPU; two address registers for storing the addresses of two locations in said ROM at which the stored contents are to be altered; a RAM for storing the altered content at each of the two locations; two match circuits respectively connected to said address registers, each of the match circuits comparing the address outputted from the CPU to the address bus and the addresses stored in said address registers, and outputting a signal corresponding to the result of the comparison; a pair of start address storing means respectively connected to said match circuits, each of the start address storing means storing the start addresses of said two contents stored in said RAM, and outputting the start address stored therein when the match circuit connected thereto outputs a match signal indicating an address match as a result of the comparison; op code storing means for storing an op code of a jump instruction for jumping from the program in said ROM to one of said altered contents stored in said RAM, said op code storing means outputting said op code when the match signal is outputted from one of said match circuits; and connection control means connected to said match circuits, the connection control means connecting said ROM to the data bus and disconnecting said op code storing means and said start address storing means from the data bus when none of said match circuits outputs the match signal, and when one of the match circuits outputs the match signal, the connection control means disconnecting said ROM from the data bus and connecting said op code storing means and the start address storing means supplied with said match signal from said one match circuit to the data bus to output the op code of the jump instruction and said start address which is an operand of the jump instruction on the data bus, wherein the CPU executing said ROM program reads said jump instruction op code and said start address outputted on the data bus, jumps to said start address from said ROM program, and executes said altered content from said start address, thereby altering the program stored in said ROM.

According to another aspect of the invention, there is also provided a microcomputer in which a CPU outputs an address on an address bus and reads program data via a data bus from a memory of said address, to execute a program, including a ROM for storing said program executed by the CPU; two address registers for storing the addresses of two locations in said ROM at which the stored contents are to be altered; two match circuits respectively connected to said address registers, each of the match circuits comparing the address outputted from the CPU to the address bus and the addresses stored in said address registers, and outputting a signal corresponding to the result of the comparison; means for storing a flag connected to said match circuits, the flag indicating which of the addresses stored in said two address registers matches the address outputted to the address bus by a value set according to the levels of the signals outputted from said match circuits; a RAM for storing the altered contents at said two locations, and also storing an instruction to read said flag and a group of instructions for branching to one or the other of said two altered contents in accordance with the value of said flag read by the instruction; start address storing means for storing the start address of said flag read instruction stored in said RAM, and outputting said start address; op code storing means for storing an op code of a jump instruction for jumping from the program in said ROM to said flag read instruction in said RAM, and for outputting said op code; and connection control means connected to said match circuits, the connection control means connecting said ROM to the data bus and disconnecting said op code storing means and said start address storing means from the data bus when none of said match circuits outputs the match signal, and when one of said match circuits outputs the match signal of the level indicating an address match as a result of the comparison, the connection control means disconnecting said ROM from the data bus and connecting said op code storing means and the start address storing means supplied with said match signal from said one match circuit to the data bus to output the op code of the jump instruction and said start address of said flag read instruction which is an operand of the jump instruction on the data bus; and wherein while executing said ROM program, the CPU reads both said jump instruction op code and said start address outputted to the data bus, and executes the altered contents corresponding to the flag value after jumping to said start address from said ROM program and reading said flag, thereby altering the program stored in said ROM.

In a preferred modification to the invention, each of the start address storing means is a write enable register.

In another preferred modification to the invention, the start address storing means and the op code storing means are in areas of the ROM.

In a further preferred modification to the invention, a permission flag is provided which permits the alteration of the ROM program by applying the match signal from the match circuits to the connection control means, and prohibits the alteration of the ROM program by stopping allowing the match signal from the match circuits to the connection control means.

BRIEF DESCRIPTION OF THE DRAWINGS

FIG. 2 is a block diagram showing the configuration of a microcomputer, having a ROM program alterability, according to a first embodiment of the present invention;

FIG. 9 is a diagram showing the storage organization of a RAM according to the fourth embodiment;

DESCRIPTION OF THE PREFERRED EMBODIMENTS

EXAMPLE 1

Figure 1:
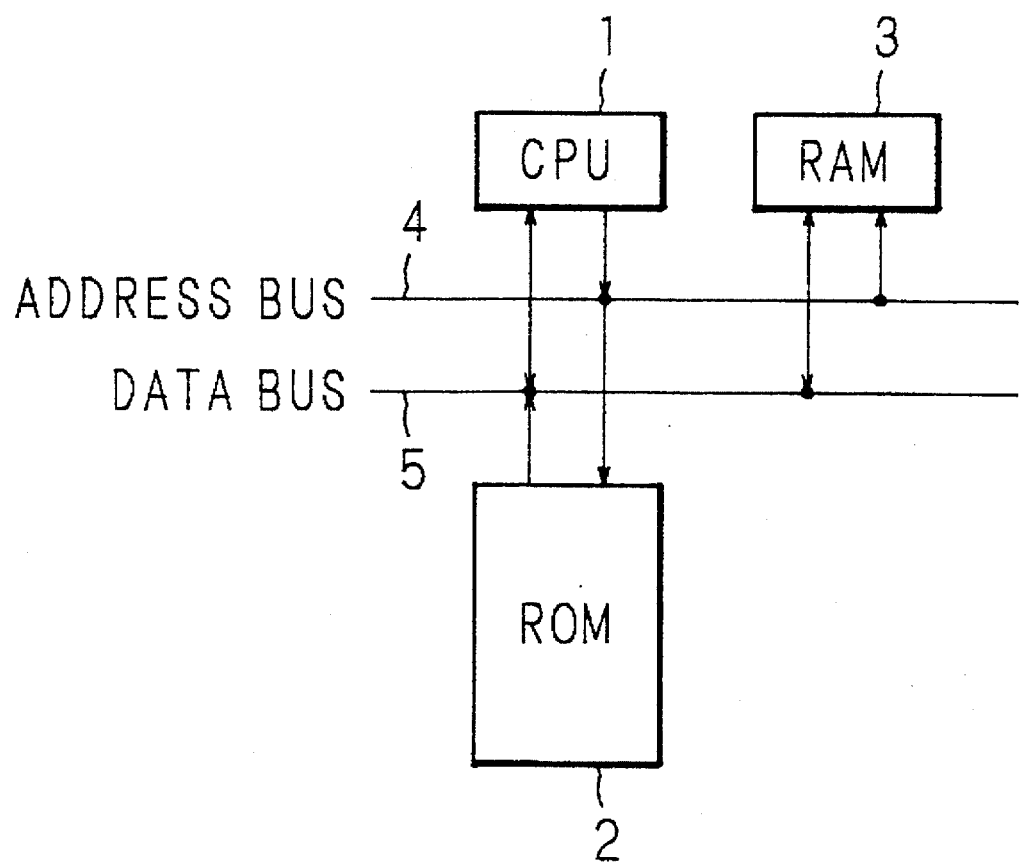
FIG. 1 is a block diagram showing the configuration of a prior art microcomputer.

Referring to FIG. 2, a CPU 1 reads and executes a program written in a mask ROM 2, and performs operations using the data stored in a RAM 3 during the execution of the program. Then it stores the results of the operations in the RAM 3.

Connected to the CPU 1 via an address bus 4 and a data bus 5 are: first to third change address registers 6a–6c, which can be written and read by the CPU 1, for storing the addresses of locations (hereinafter referred to as the change addresses) at which the contents of the program stored in the mask ROM 2 are to be altered because of a bug or the like; a 3-bit permission flag, which can be written and read by the CPU 1, for permitting or prohibiting the alteration of the ROM program by enabling or disabling the outputs of first to third match circuits 9a–9c (to be described later) that output signals representing the results of the comparisons between the address placed on the address bus 4 and the change addresses stored in the respective change address registers 9a–9c; and a serial communication circuit 13 for accumulating serial data received from the outside via an input port 12.

The CPU 1 is also connected, via the address bus 4 and a signal line of an instruction fetch signal a, to the first to third match circuits 9a to 9c that respectively compare the change addresses with the address on the address bus 4 in synchronism with the output timing of the instruction fetch signal a from the CPU 1, and output signals indicating the results of the comparisons (a "1" level indicates an address match, and a "0" level indicates an address mismatch). The CPU 1 outputs an address on the address bus 4, and reads data from the addressed location via the data bus 5 or writes data via the data bus 5 to the address outputted on the address bus 4. The RAM 3 stores a plurality of correction programs for correcting a plurality of bugs in the program written in the mask ROM 2.

The first to third match circuits 9a–9c are connected to a three-input OR circuit 14. The output of the OR circuit 14 is connected to a connection control means 10 which selects either the mask ROM 2 or a jump op code output circuit 7 and first to third start address output circuits 8a–8c for connection to the data bus 5 in accordance with the output level of the OR circuit 14 (which outputs a "1" level when the result of comparison from any one of the match circuits 9a–9c indicates a match, and a "0" level when all the comparison results indicate a mismatch). The jump op code output circuit 7, which is constructed from a combination of ordinary pull-up and pull-down transistors, generates an op code of a jump instruction for output. The start address output circuits 8a–8c each generates and outputs an operand of a jump instruction, that is, the start address in the RAM 3 at which a correction program corresponding to a bug portion is stored. Each start address output circuit 8 outputs a start address when the match circuit 9 connected thereto outputs a match signal.

When the CPU 1 sets "000" in the 3-bit permission flag 11, the comparison result signal outputs of the match circuits 9a–9c are disabled, prohibiting the alteration of the ROM program. On the other hand, when "111" is set, the comparison result signal outputs of the match circuits 9a–9c are enabled, permitting the alteration of the ROM program.

Figure 3B:
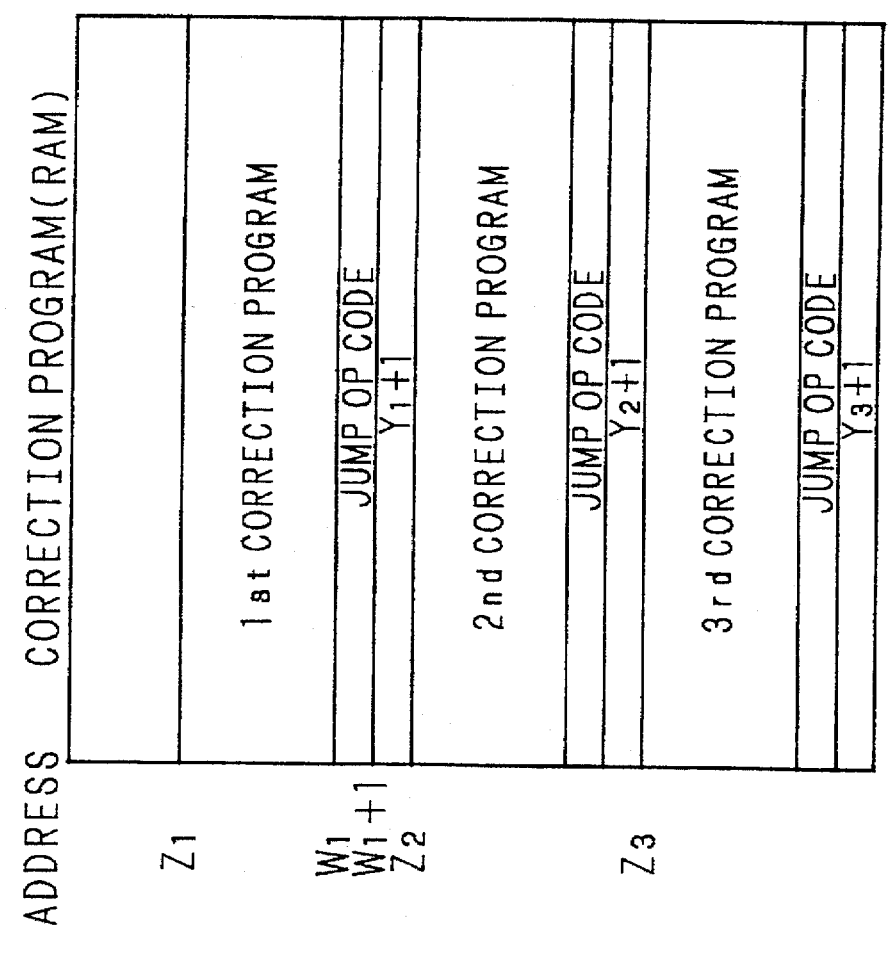
FIG. 3B is a diagram showing how programs are stored in a RAM according to the first embodiment.
Figure 3A:
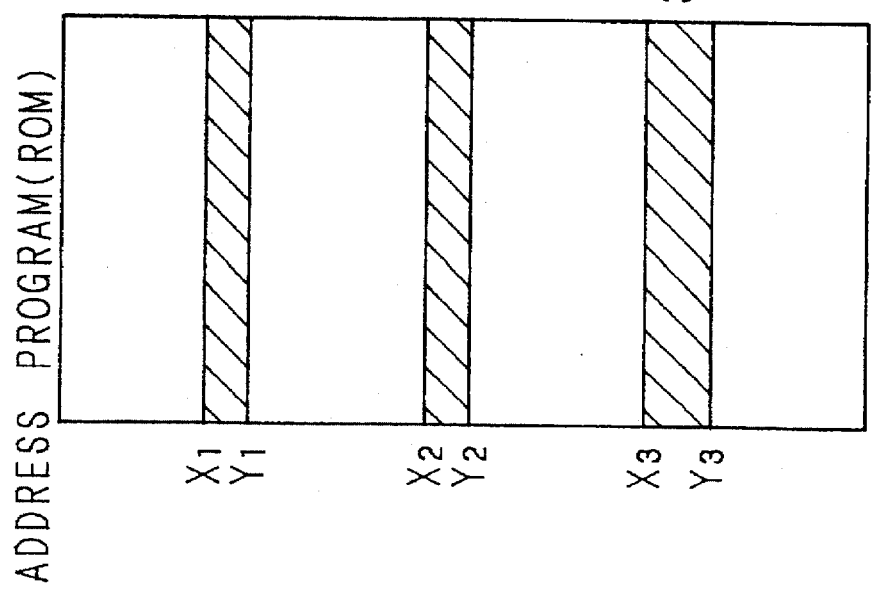
FIG. 3A is a diagram showing how programs are stored in a ROM according to the first embodiment.

This embodiment is operated as follows:

FIG. 3A is a diagram illustrating how a program is stored in the mask ROM 2, and FIG. 3B is a diagram illustrating how correction programs are stored in the RAM 3. The description of this embodiment hereinafter given deals with an example in which bugs are found at locations indicated by oblique hatching in the figure, that is, a first bug at addresses $X_1$ to $Y_1$, a second bug at addresses $X_2$ to $Y_2$, and a third bug at addresses $X_3$ to $Y_3$.

When the microcomputer is reset, the CPU 1 reads data from an external memory (such as an EEPROM or EPROM) via the input port 12 and serial communication circuit 13, and writes them into the corresponding memories as follows:

(1) Writes in the permission flag 11 a value indicating whether or not a jump is permitted from the location of a bug in the program in the ROM 2 to the corresponding correction program in the RAM 3.

(2) Writes the start address $X_1$ of the first bug in the program in the mask ROM 2 into the first change address register 6a, the start address $X_2$ of the second bug into the second change address register 6b, and the start address $X_3$ of the third bug into the third change address register 6c.

(3) Writes in the RAM 3 the first to third correction programs for correcting the contents of the ROM2 program at the first to third bug locations, each correction program being followed by the op code of the jump instruction and the start address ($Y_1+1$, $Y_2+1$, or $Y_3+1$) of the portion of the ROM2 program to which control returns after the execution of the correction program. At this time, if the first to third start address output circuits 8a–8c are set to output addresses $Z_1$, $Z_2$, and $Z_3$, respectively, the CPU 1 writes the first correction program starting at address $Z_1$, the second correction program starting at address $Z_2$, and the third correction program starting at address $Z_3$, as shown in FIG. 3B.

After writing the data to the respective memories, as described above, the CPU 1 sets the permission flag 11 to "111" to permit the alteration of the ROM 2 program, the operation of which will be described below with reference to the timing chart shown in FIG. 4.

The CPU 1 outputs on the address bus 4 the value of a program counter (not shown) provided to count the address of the next instruction to be executed, and reads the program data from that address via the data bus to execute the instruction. The CPU 1 outputs an instruction fetch signal a (signal 1, signal 2, . . . ) for every three operation cycles thereof, and sequentially outputs the addresses of program data for one instruction onto the address bus 4 (for example, in the present embodiment, program data at addresses $X_1$, $X_1+1$, and $X_1+2$ constitute one instruction). At this time, if none of the match circuits 9a–9c are outputting a match signal, the CPU 1 fetches program data, via the data bus 5, from the ROM 2 addressed by the address outputted on the address bus 4, and executes the instruction.

Figure 4:
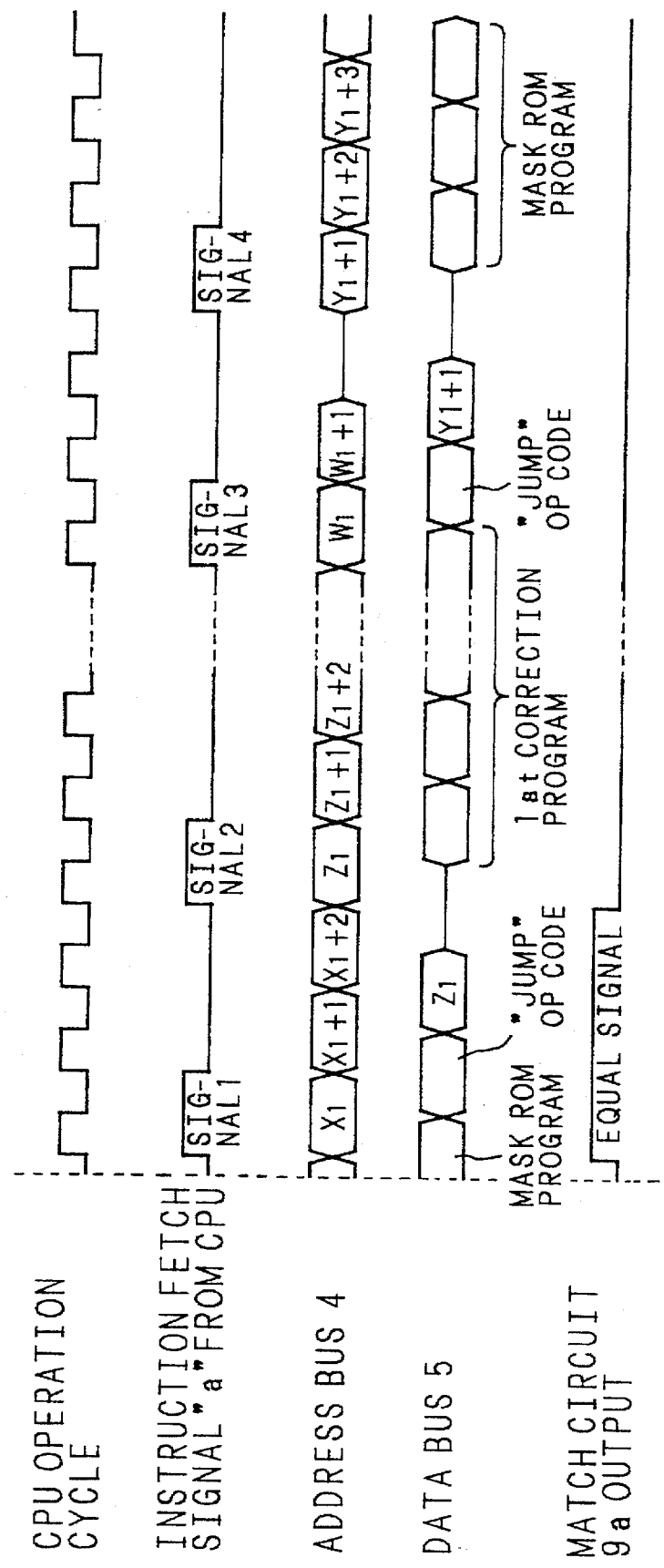
FIG. 4 is a timing chart for address signal and data signal outputs, according to the first embodiment.

On the other hand, in synchronism with the output timing of the instruction fetch signal a from the CPU 1, the first to third match circuits 9a–9c compare the respective change addresses, $X_1$, $X_2$, and $X_3$, with the start address ($X_1$) of the addresses outputted on the address bus 4, as shown in FIG. 4. In the present embodiment, the start address $X_1$ on the address bus 4 matches the change address stored in the first change address register 6a; as a result, the first match circuit 9a continues to output a match signal of "1" level until the rising of the signal 2 when the next instruction fetch cycle begins. The connection control means 10 disconnects the ROM 2 from the data bus 5, and connects the jump op code output circuit 7 and one of the start address output circuits 8a–8c, selected based on the output of the match signal, to the data bus 5.

When the next instruction fetch cycle initiated by the output of the signal 2, the outputs of the match circuits 9a–9c are returned to the "0" level and held at that level until a match is detected the next time; at the same time, the connection control means 10 disconnects the jump op code output circuit 7 and start address output circuits 8a–8c from the data bus 5, and connect the ROM 2 to the data bus 5. The match circuits 9a–9c continue to output "0" level signals as long as the address on the address bus 4 does not match any of the change addresses. The operation of the second and third match circuits 9b and 9c is the same as that of the first match circuit 9a and, in this embodiment, the second and third match circuits 9b and 9c continue to output "0" level signals throughout the period shown in FIG. 4.

The outputs of the first to third match circuits 9a–9c are supplied as inputs to the three-input OR circuit 14, and in accordance with the output level of the OR circuit 14 the connection control means 10 selects the ROM 2 or the jump op code output circuit 7 and start address output circuits 8a–8c for connection to the data bus 5. More specifically, when the address on the address bus 4 does not match any of the addresses held in the change address registers 6a–6c, with all the match circuits 9a–9c outputting 0s, the connection control means 10 connects the mask ROM 2 to the data bus 5 so that the program data from the mask ROM 2 is outputted on the data bus 5.

On the other hand, when a match signal "1" is outputted from the first match circuit 9a, as in the above example, the OR circuit 14 outputs "1" and the connection control means 10 disconnects the mask ROM 2 from the data bus 5 so that the program data at addresses $X_1$, $X_1+1$, and $X_1+2$ are not outputted on the data bus 5. Instead, in accordance with the output "1" from the OR circuit 14, the connection control means 10 connects the jump op code output circuit 7 to the data bus 5. At the same time, the outputs of the match circuits 9a–9c are inputted to the respective start address output circuits 8a–8c, and the start address output circuit (8a in the present embodiment) to which the match signal "1" is inputted is selected for connection to the data bus 5. As a result, following the program data outputted from the ROM 2 onto the data bus 5 in the previous fetch cycle, the jump instruction op code from the jump op code output circuit 7 and the start address $Z_1$ from the start address output circuit 8a are outputted in this order onto the data bus 5, as shown in FIG. 4, after the ROM 2 is disconnected from the data bus 5.

The CPU 1 then fetches the jump instruction op code and the start address $Z_1$, the operand of the jump instruction, deposited on the data bus 5, and executes the jump instruction sequence in which the address $Z_1$ to be jumped to is set in the program counter and the address $Z_1$ set in the program counter is outputted on the address bus 4 in synchronism with the output of the signal 2 (FIG. 4) which initiates the next instruction fetch cycle. Thereafter, as shown in FIG. 4, the CPU 1 sequentially outputs on the address bus 4 the count value of the program counter which is sequentially incremented from the address $Z_1$, that is, the addresses $Z_1$ to $W_1-1$ at which the first correction program is stored in the RAM 3, and sequentially executes instructions by fetching the data of the first correction program via the data bus from the RAM 3.

At address $W_1$ subsequent to the first correction program, a jump instruction op code is stored, and at address $W_1+1$, address $Y_1+1$ subsequent to the end address of the first bug is stored, as shown in FIG. 3B. Therefore, at the rising of the signal 3 which is the next instruction fetch signal a in FIG. 4, the CPU 1 fetches via the data bus 5 the data at the addresses $W_1$ and $W_1+1$ outputted on the address bus 4, i.e., the jump instruction op code and the operand $Y_1+1$. Upon fetching the jump instruction op code and the start address $Y_1+1$, the CPU 1 executes the jump instruction sequence in the same manner as described above; that is, the address $Y_1+1$ in the ROM 2 to be jumped to is set in the program counter and the address $Y_1+1$ set in the program counter is outputted on the address bus 4 in synchronism with the output of the signal 4 (instruction fetch signal a) in FIG. 4 which initiates the next instruction fetch cycle. Thereafter, the CPU 1 sequentially outputs on the address bus 4 the count value of the program counter which is sequentially incremented from the address $Y_1+1$, that is, the addresses at which the program after the first bug portion is stored in the ROM 2, and sequentially executes instructions by fetching the program data via the data bus 5 from the ROM 2, now connected to the data bus 5, in the cycle following the instruction fetch cycle in which the match signal was outputted from the match circuit 9a.

When the ROM2 program reaches the second and third bug portions, respectively, during the program execution, the second and third change address registers 6b ad 6c, start address output circuits 8b and 8c, and match circuits 9b and 9c, corresponding to the respective bugs, perform operations similar to those performed to handle the first bug, and the CPU 1 carries out the second correction program instead of the second bug portion and the third correction program instead of the third bug portion, thus accomplishing the alteration of the ROM2 program.

On the other hand, when the CPU 1 sets the permission flag 11 to "000", the outputs of the match circuits 9a–9c are disabled. In this case, the mask ROM 2 is always connected to the data bus 5, and the jump op code output circuit 7 and first to third start address output circuits 8a–8c will never be connected to the data bus 5, so that the CPU 1 always carries out the program stored in the ROM 2.

Figure 5:
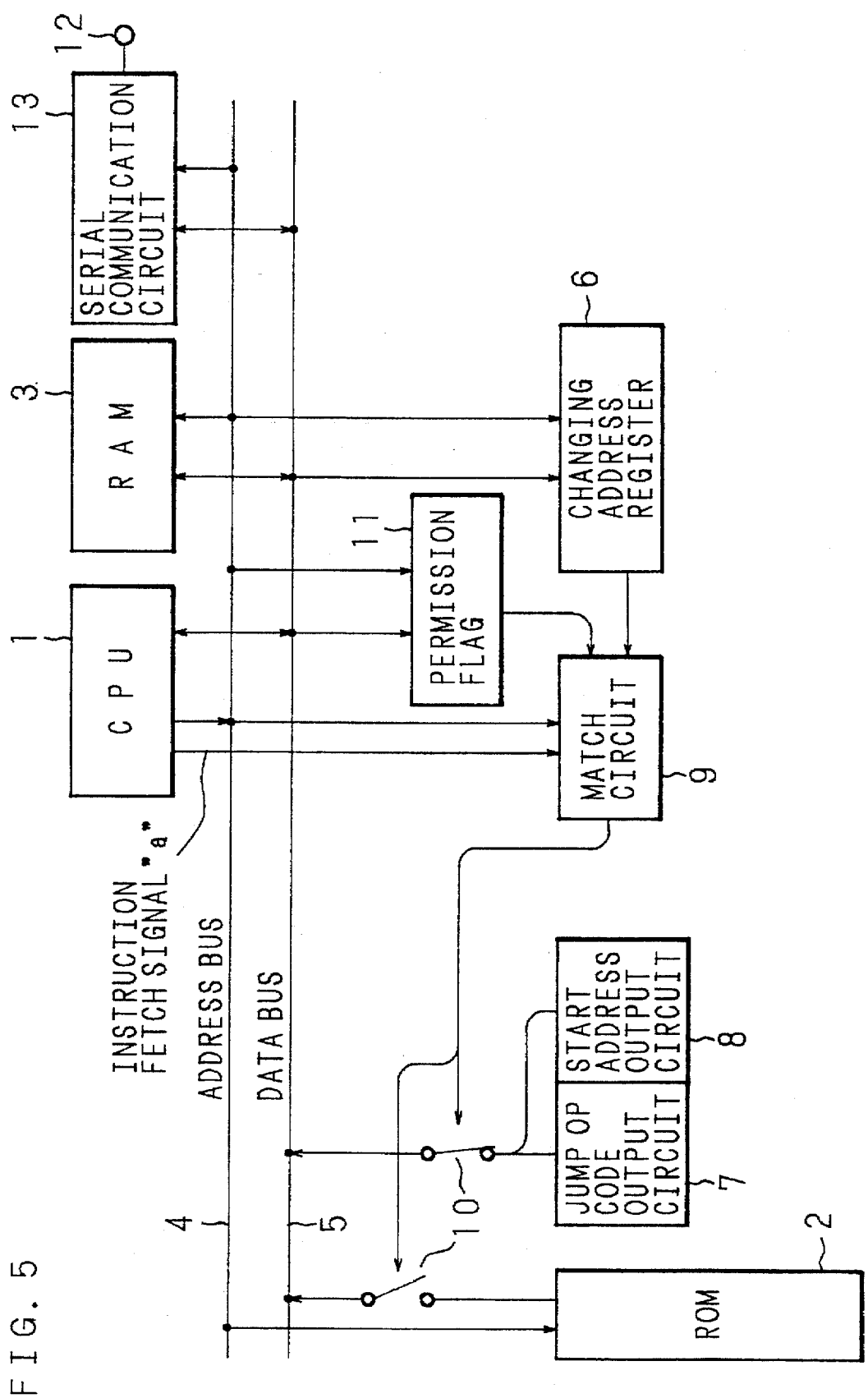
FIG. 5 is a diagram showing the configuration of a modified example of the first embodiment.

In cases where the number of portions to be corrected is limited to one, ROM program alteration can be accomplished using simple circuitry as shown in FIG. 5. In the figure, the same or corresponding parts to those shown in FIG. 2 are designated by the same reference numerals, and description of such parts will not be repeated here. In such cases, as shown in FIG. 5, any of the change address register 6, start address output circuit 8, and match circuit 9 need not be provided more than one, and further, the match signal from the match circuit 9 may be inputted directly to the connection control means 10. Furthermore, the start address output circuit 8 is constructed to output the start address following the jump op code with the timing shown in FIG. 4 when it is connected by the connection control means 10 to the data bus 5, even if it is not supplied with a match signal from the match circuit 9. In other respects, the operation is the same as that of FIG. 2 and description thereof will not be repeated here.

EXAMPLE 2

Figure 6:
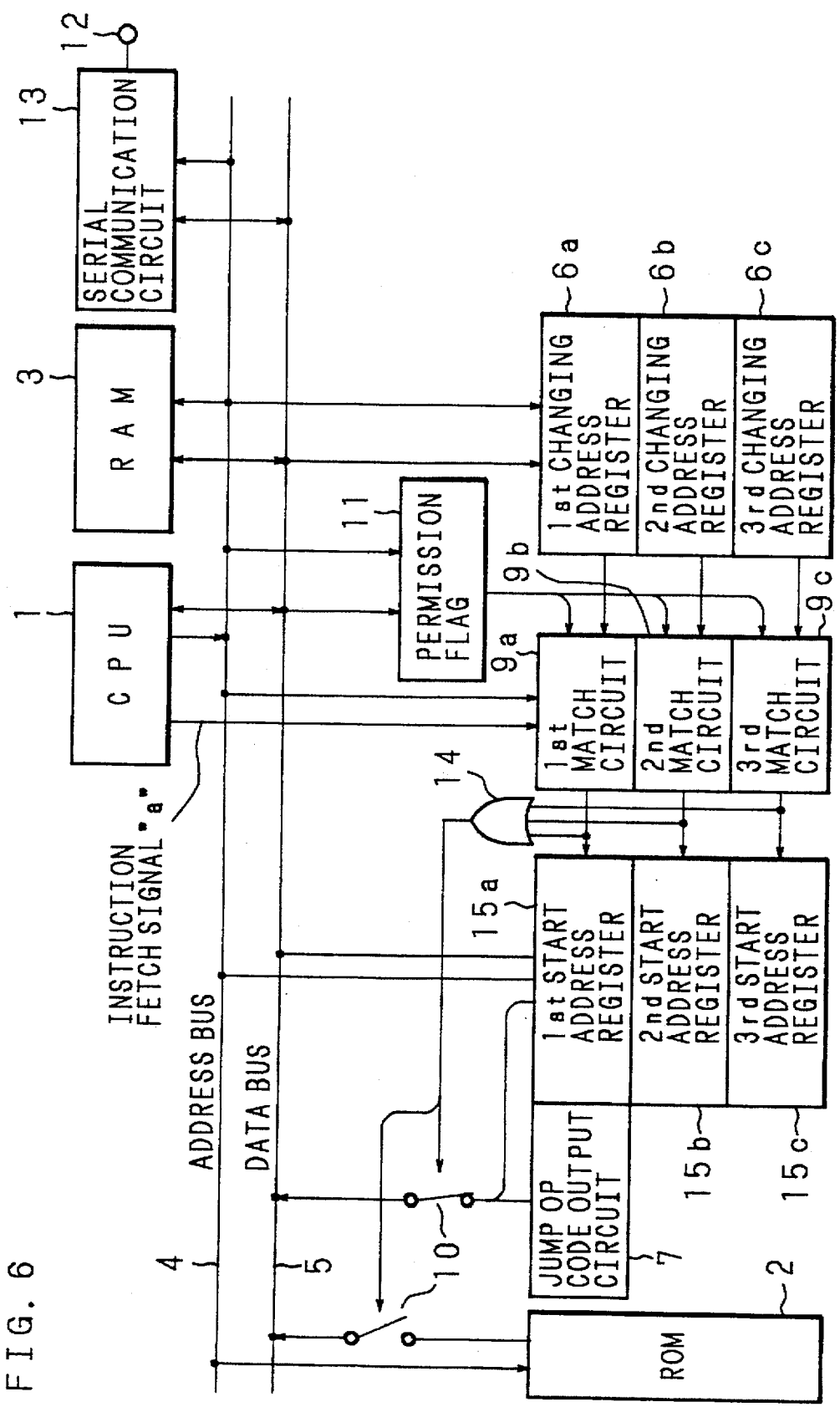
FIG. 6 is a block diagram showing the configuration of a microcomputer according to a second embodiment of the present invent.

As is evident from FIG. 6, wherein like reference numerals designate like elements and components to those in FIG. 2, EXAMPLE 2 is different from EXAMPLE 1 shown in FIG. 2 in that the start addresses of the correction programs in the RAM 3 are stored in the first to third start address registers 15a, 15b, and 15c, respectively, which can be written to by the CPU 1.

When the microcomputer is reset, the CPU 1 outputs the addresses of the start address registers 15a–15c onto the address bus 4, and writes the start addresses $Z_1$, $Z_2$, and $Z_3$, supplied from an external memory (for example, an EEPROM or EPROM) via the input port 12 and serial communication circuit 13, into the first to third start address registers 15a, 15b, and 15c, respectively, via the data bus 5. The start address registers 15a–15c are connected to the respective match circuits 9a–9c. Input operations of the match signals from the match circuits 9a–9c and output operations of the start addresses onto the data bus 5 in response to the match signal input are the same as those of the first embodiment shown in FIG. 2. Furthermore, the other operations performed to alter the ROM2 program and the operations performed when the alteration of the ROM2 program is prohibited are the same as those of the first embodiment, and therefore, description of such operations will not be repeated here.

In EXAMPLE 2, the start addresses are stored in the registers which can be written and read by the CPU 1; that is, after mapping the correction programs to convenient addresses in the RAM 3, the start addresses of the correction programs are set in the respective registers by the CPU 1 and the alteration of the ROM program cam thus be accomplished. This provides increased flexibility in mapping the correction programs to the memory space of the RAM 3 and, at the same time, allows efficient use of the address space of the RAM 3.

EXAMPLE 3

Figure 7:
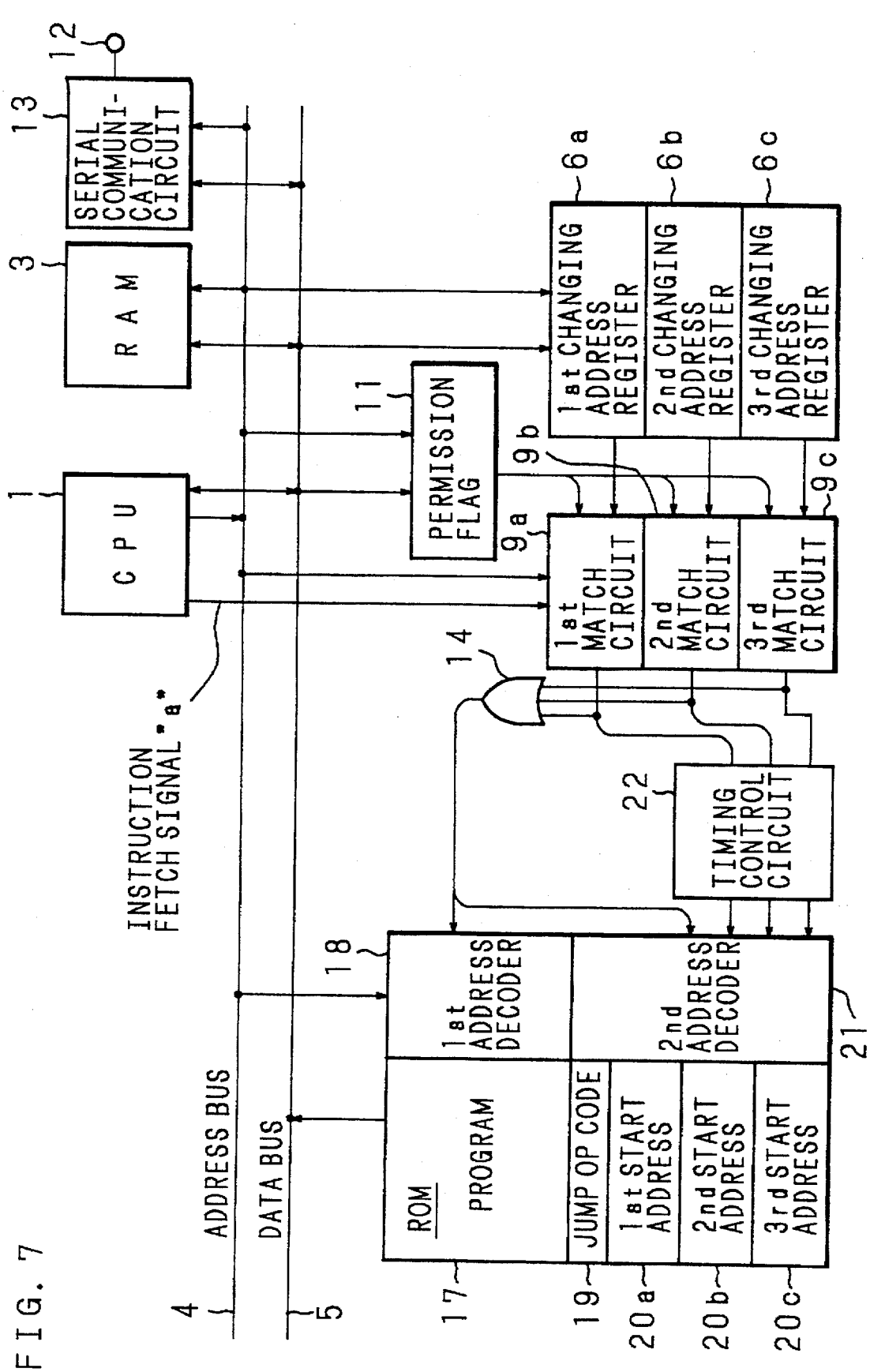
FIG. 7 is a block diagram showing the configuration of a microcomputer according to a third embodiment of the present invention.

As is evident from FIG. 7, wherein like reference numerals designate like elements and components to those in FIG. 2, EXAMPLE 3 is different from EXAMPLE 1 shown in FIG. 2 in that the jump instruction op code and the start addresses of the first to third correction programs in the RAM 3 are stored in ROM spaces 19, 20a, 20b, and 20c, respectively, outside the ROM space 17 where the ROM program is stored. In the present embodiment, the output of the OR circuit 14 is connected to a first address decoder 18 for decoding the addresses of the ROM space 17 where the ROM program is stored, and also to a second address decoder 21 for decoding the output of the OR circuit 14 and the outputs of the match circuits 9a–9c into the addresses in the ROM spaces 19, 20a, 20b, and 20c. When none of the match circuits 9a–9c are outputting a match, and therefore, the output of the OR circuit 14 is at the "0" level, the first address decoder 18 is enabled; on the other hand, when one of the match circuits 9a–9c is outputting a match, and therefore, the output of the OR circuit 14 is at the "1" level, the second address decoder 21 is enabled. The match circuits 9a–9c are connected to the second address decoder 21 via a timing control circuit 22 which controls the output timing with which the jump instruction op code and start addresses are outputted onto the data bus 5 from the ROM spaces 19, 20a, 20b, and 20c.

In this EXAMPLE 3 the ROM program is altered as follows:

When the execution of the program in the ROM space 17 has not yet reached a portion that needs correction due to a bug or the like and, therefore, the address on the address bus 4 does not match any of the change addresses stored in the first to third change address registers 6a–6c, that is, when the output of the OR circuit 14 is at the "0" level, the first address decoder 18 is enabled and the second address decoder 21 is disabled. In this case, the program in the ROM space 17 designated by the address on the address bus 4 is carried out.

When the program in the ROM space 17 reaches a bug portion during the program execution and the address on the address bus 4 matches one of the change addresses stored in the change address registers 6a–6c, one of the match circuits 9a–9c outputs a match signal "1". As a result, the output of the OR circuit 14 becomes "1", disabling the first address decoder 18 and enabling the second address decoder 21. At this time, the outputs of the match circuits 9a–9c are fed into the second address decoder 21 via the timing control circuit 22, upon which the jump instruction op code is outputted on the data bus 5, while the outputs of the match circuits 9a–9c are decoded into the addresses in the ROM spaces 20a–20c and the start address of the ROM spaces 20a–20c, that is, the start address corresponding to the match circuit 9 that is outputting the match signal "1", is outputted on the data bus 5. In this process, the timing control circuit 22 controls the output timing with which signals are outputted from the match circuits 9a–9c for input to the second address decoder 21, and thereby controls the output timings of the jump instruction op code and the start address so that they are outputted on the data bus 5 with the timings shown in FIG. 4. The other operations performed to alter the ROM program and the operations performed when the alteration of the ROM program is prohibited are the same as those of the first embodiment shown in FIG. 2.

Since the jump instruction op code and the start addresses are stored in the ROM, as described above, the present embodiment eliminates the need for such components as the jump op code output circuit 7 and start address output circuits 8a–8c shown in the first embodiment, which contributes to making the apparatus compact in construction.

EXAMPLE 4

Figure 8:
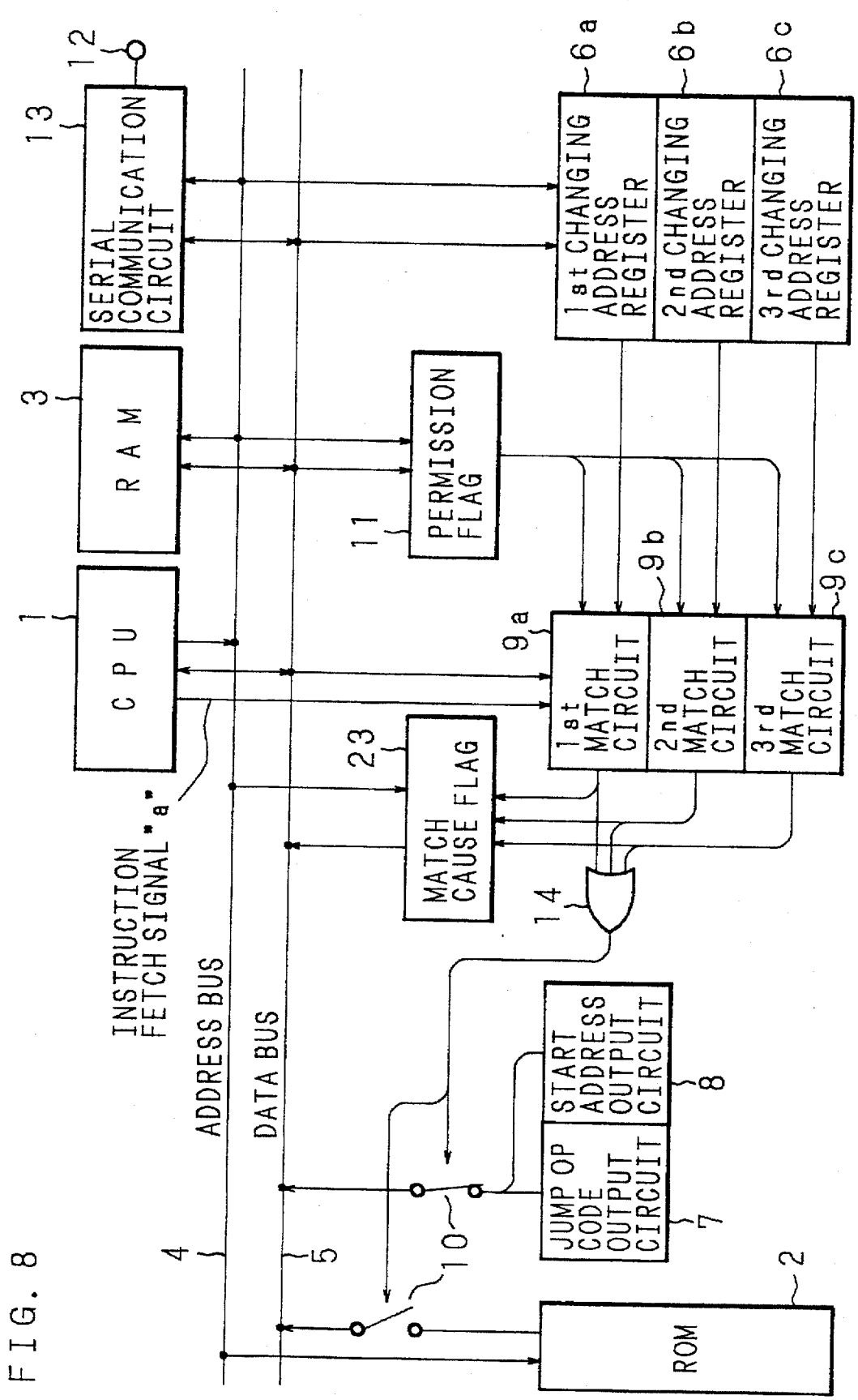
FIG. 8 is a block diagram showing the configuration of a microcomputer according to a fourth embodiment of the present invention.

Referring to FIGS. 8 and 9, this example will be described, wherein like reference numerals designate like elements and components to those of EXAMPLE 1 shown in FIG. 2:

EXAMPLE 4 is different from EXAMPLE 1 in that a 3-bit match cause flag 23 is provided which is set to a value representing the output levels of the first to third match circuits 9a–9c and indicating which of the change addresses stored in the first to third change address registers 6a–6c matches the address on the address bus 4, that is, which correction program should be selected for execution from among the plurality of correction programs that substitute for the bug portions, and in that a read instruction to read the match cause flag 23 and a group of conditional branch instructions for branching to one of the correction programs corresponding to the bug portions in accordance with the value of the match cause flag 23, are stored in the RAM 3 together with the plurality of correction programs. The match cause flag 23 is constructed from a memory that can be read by the CPU 1 and that can be cleared on a bit-by-bit basis.

In the RAM 3, the read instruction to read the match cause flag 23 and the conditional branch instructions for branching to address $Z_1$, $Z_2$, or $Z_3$, according to the value of the match cause flag 23, are stored starting at address $Z_0$, in addition to the first to third correction programs, similar to those in the first embodiment, (starting at addresses $Z_1$, $Z_2$, and $Z_3$, respectively) that are substituted for the first to third bug portions.

The start address output circuit 8 outputs the address $Z_0$ of the read instruction, stored in the RAM 3, for reading the match cause flag 23, and outputs the start address at the moment that the connection control means 10 connects the start address output circuit 8 to the data bus 5 by the output of the "1" level signal from the OR circuit 14.

Next, ROM program correction performed by the microcomputer in EXAMPLE 4 will be described.

When the address $Y_1$ of the first bug is outputted on the address bus 4 and a match signal "1" is outputted from the first match circuit 9a as a result of the comparison with the change address stored in the first change address register 6a, "100" is set in the match cause flag 23. At the same time, the OR circuit 14, whose three inputs are coupled to the outputs of the match circuits 9a–9c, outputs a "1" level signal which is inputted to the connection control means 10. As a result, the ROM 2 is disconnected from the data bus 5, and instead, the jump op code output circuit 7 and the start address output circuit 8 are connected to the data bus 5. The jump instruction op code and the address $Z_0$ in the RAM 3 are respectively outputted from the jump op code output circuit 7 and the start address output circuit 8 onto the data bus 5 with the timings shown in FIG. 4. The CPU 1 executes the match cause flag read instruction at the address $Z_0$ in the RAM 3 to read the value set in the match cause flag 23. Then, the CPU 1 executes the conditional branch instruction following the read instruction, to branch to the first correction program to be executed when the value of the match cause flag 23 is "100". The CPU 1 carries out the first correction program by outputting the address $Z_1$ and subsequent addresses of the first correction program in synchronism with the output timing of the instruction fetch signal a. After completion of the first correction program, control returns to the program in the ROM 2, as in the first embodiment.

Likewise, when the address $Y_2$ of the second bug is outputted on the address bus 4 and a match signal "1" is outputted from the second match circuit 9b, "010" is set in the match cause flag 23. The CPU 1 first jumps to the address $Z_0$ in the RAM 3, outputted on the data bus 5, and executes the match cause flag read instruction, as in the above operation, and then makes a branch to execute the second correction program $Z_2$ which is to be executed when the value of the match cause flag 23 is "010". After completion of the second correction program, control returns to the program in the ROM 2, as in EXAMPLE 1.

Further, when the address $Y_3$ of the third bug is outputted on the address bus 4 and a match signal "1" is outputted from the third match circuit 9c, "001" is set in the match cause flag 23. The CPU 1 first jumps to the address $Z_0$ in the RAM 3, outputted on the data bus 5, and executes the match cause flag read instruction, as in the above operation, and then makes a branch to execute the third correction program $Z_3$ which is to be executed when the value of the match cause flag 23 is "001". After completion of the third correction program, control returns to the program in the ROM 2, as in EXAMPLE 1.

Operations performed when the alteration of the ROM2 program is prohibited are the same as those described in EXAMPLE 1.

As described above, in the microcomputer of the present embodiment, which of the correction programs stored in the RAM 3 is to be executed by the CPU 1 is judged by software, not by relying on the output of each correction program start address from a circuit, and a branch is made to that correction program. Accordingly, there is no need to provide more than one start address output circuit, which is the circuit to output the address of the flag read instruction, even if the number of correction programs increases. This configuration realizes a compact hardware construction. Furthermore, since the destination of the branch can be specified as desired by RAM program, flexibility in mapping the correction programs to the RAM is increased and efficient use can be made of the RAM space.

EXAMPLE 5

Figure 10:
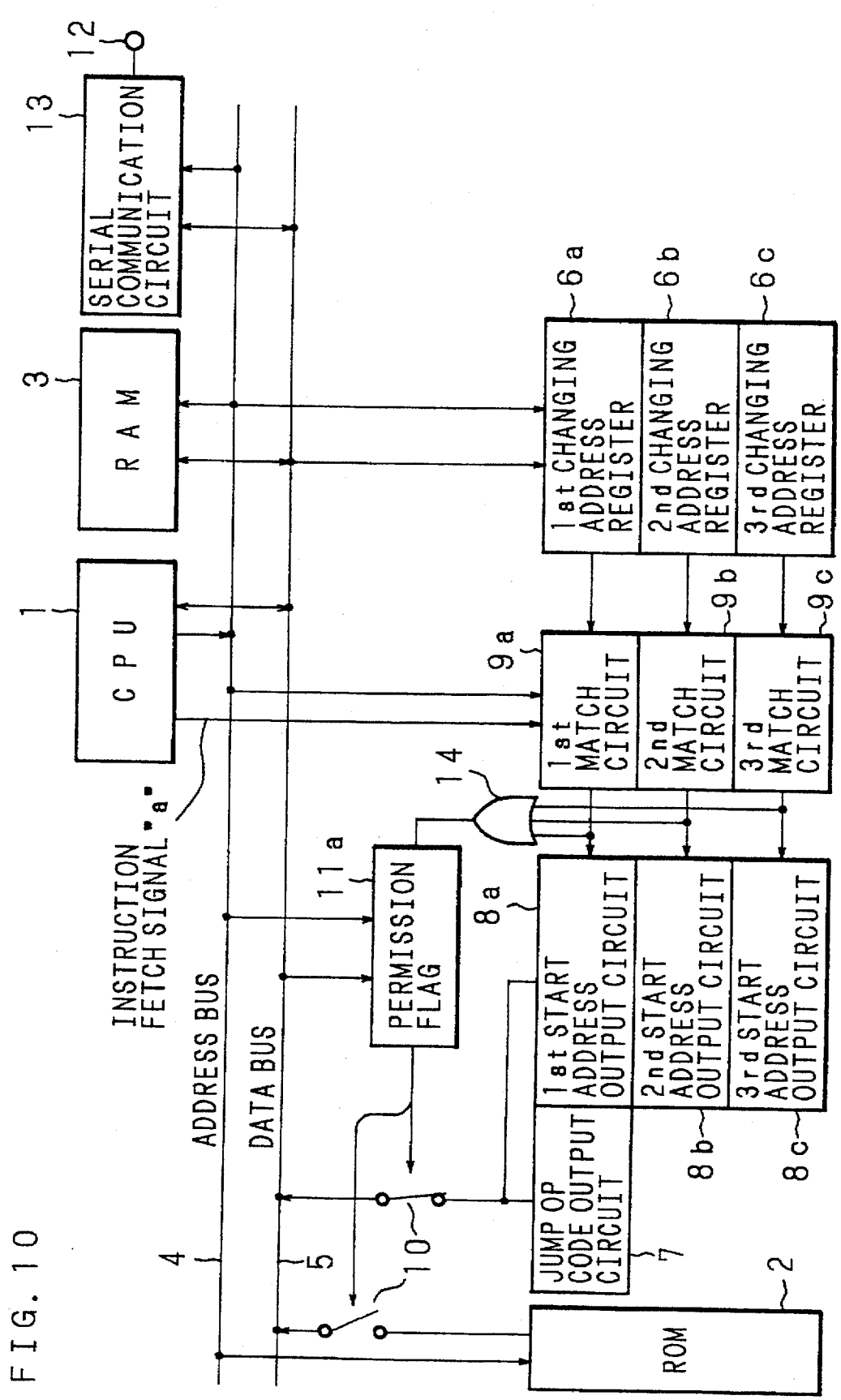
FIG. 10 is a block diagram showing the configuration of a microcomputer according to a fifth embodiment of this invention.
Figure 11:
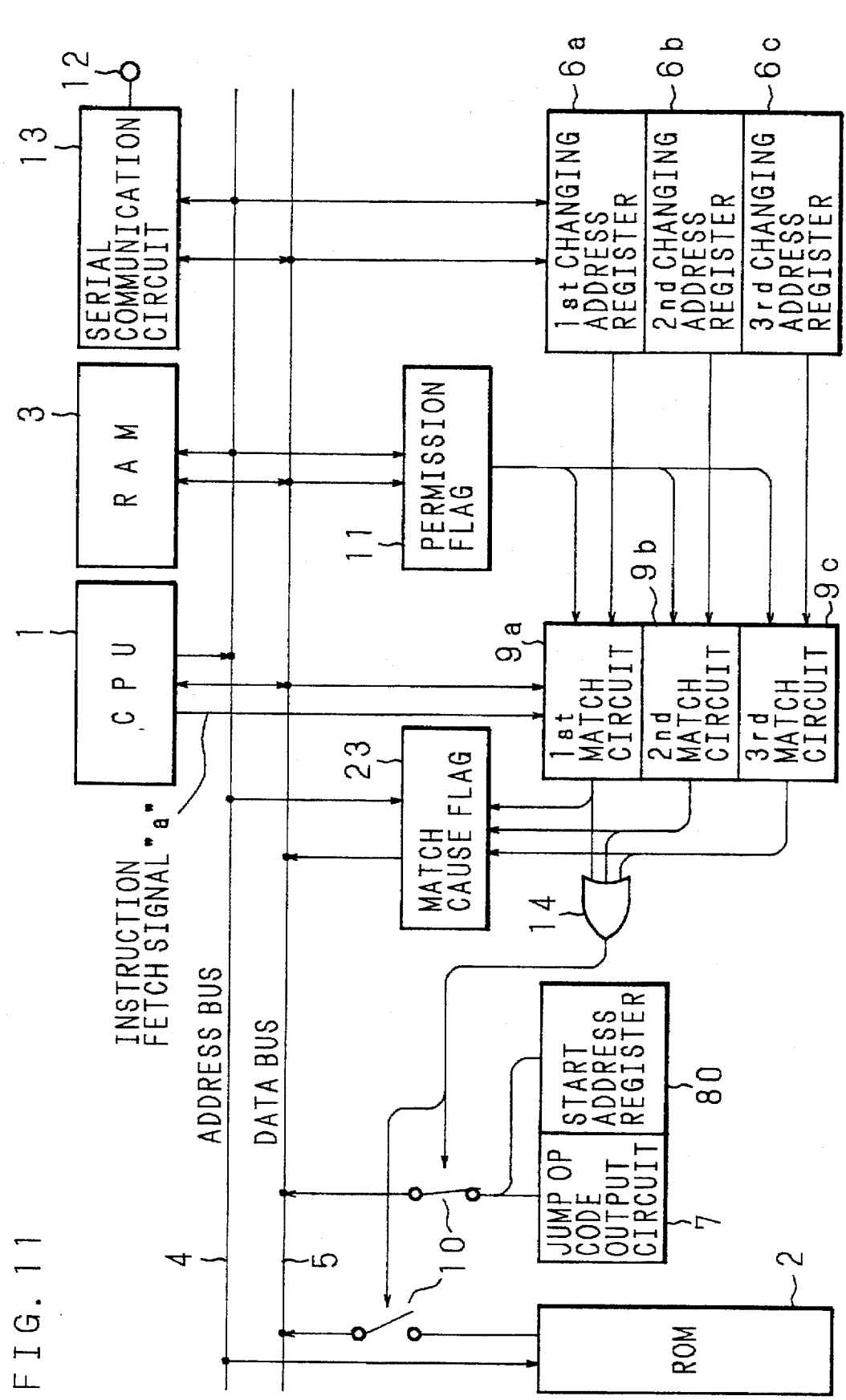
FIG. 11 is a block diagram showing a first modified example of the microcomputer according to the fourth embodiment of the present invention.
Figure 12:
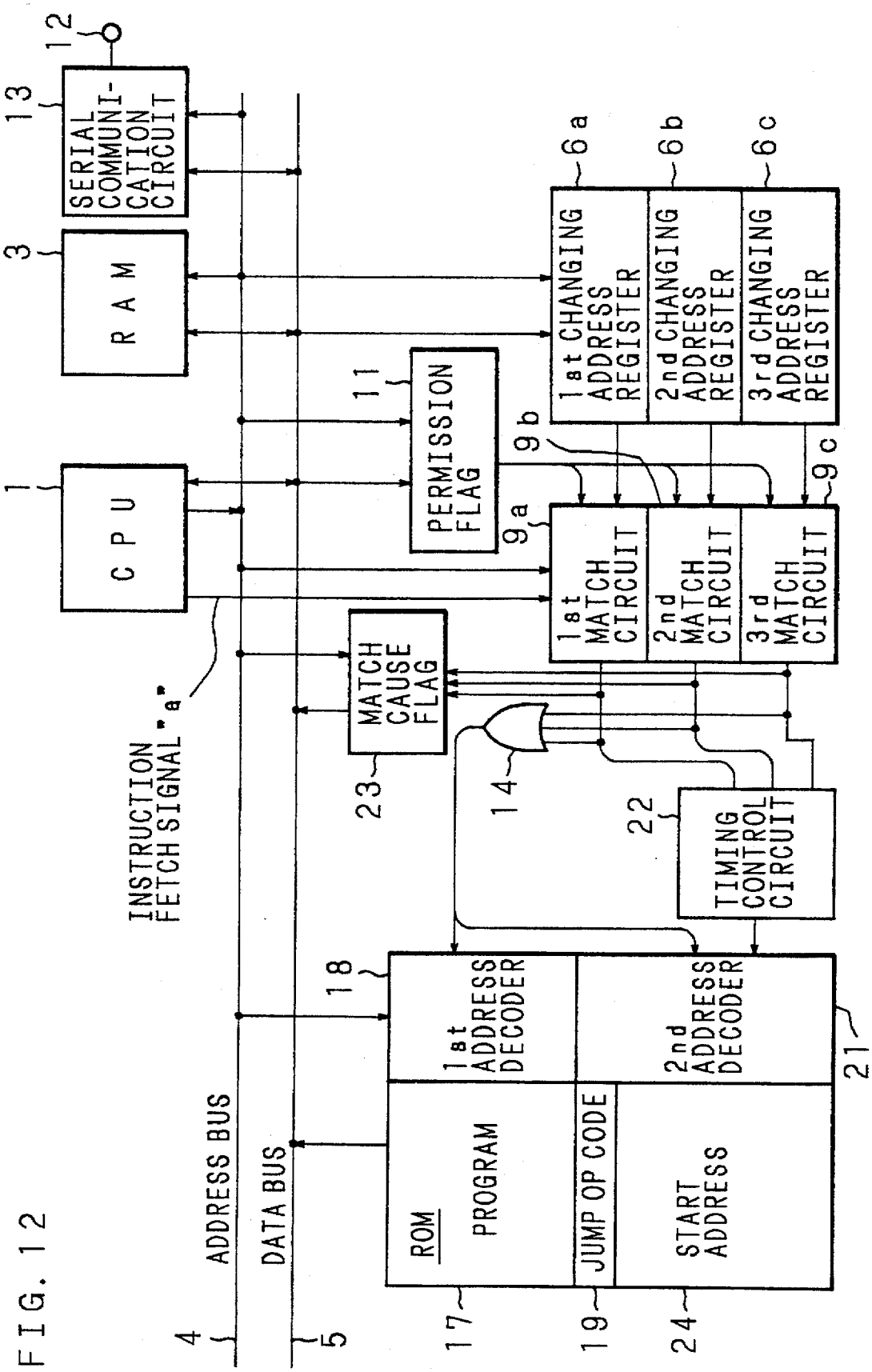
FIG. 12 is a block diagram showing a second modified example of the microcomputer according to the fourth embodiment of the present invention.

As is evident from FIG. 10, wherein like reference numerals designate like elements and components to those in EXAMPLE 1 shown in FIG. 2, EXAMPLE 5 is different from EXAMPLE 1 in that a permission flag 11a for permitting or prohibiting the alteration of the ROM2 program depending on the match signal outputs from the match circuits 9a–9c is inserted between the connection control means 10 and the OR circuit 14 whose three inputs are coupled to the outputs of the match circuits 9a–9c.

In the microcomputer of EXAMPLE 5, as in EXAMPLE 1, when the apparatus is reset, the CPU 1 reads the value supplied from an external memory via the input port 12 and serial communication circuit 13, and sets it in the permission flag 11a. When "0" is set in the permission flag 11a by the CPU 1, "0" is outputted to the connection control means 10 so that the ROM 2 is always connected to the data bus 5 and the alteration of the ROM2 program is prohibited, regardless of the output level of the OR circuit 14. On the other hand, when "1" is set in the permission flag 11a by the CPU 1, the output of the OR circuit 14 is supplied directly to the connection control means 10, and the alteration of the ROM2 program is permitted which is accomplished by branching from the ROM2 program to one of the correction programs stored in the RAM 3 when one of the change addresses stored in the change address registers 6a–6c matches the address outputted on the address bus 4. The remaining operation is the same as that of EXAMPLE 1, and will not be further described here.

As described, according to the microcomputer of the present invention, if there is a bug in the ROM program, there is no need to rebuild or remake the ROM, and the ROM program can be corrected by jumping from the portion of the ROM program that needs correction, for example, a bug portion, to a correction program stored in a RAM, and by executing the correction program. The effect of this reduces fabrication cost and shortened fabrication time.

Furthermore, according to the present invention, when correcting a plurality of portions in the ROM program, a branch occurs to the designated correction program stored in a RAM to execute the correction program each time the program reaches a portion to be corrected, and control returns to the ROM program each time the execution of the correction program is completed, thus accomplishing the alteration of the ROM program.

Moreover, according to the present invention, since the alteration of the ROM2 program can be permitted or prohibited using a one-bit flag, the initial setting is easy whether the ROM used contains bugs or not, and there is no need to reconfigure the system. Further, in the microcomputer of the present invention, permission or prohibition of the ROM2 program alteration can be controlled in a simple manner using software.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A microcomputer in which a CPU outputs an address to an address bus, reads program data via a data bus from a memory of said address, and executes a program, comprising:

a ROM for storing said program executed by the CPU;

two address registers for storing the addresses of two locations in said ROM at which the stored contents are to be altered;

a RAM for storing the altered content at each of the two locations;

two match circuits respectively connected to said address registers, each of the match circuits comparing the address outputted from the CPU to the address bus and the addresses stored in said address registers, and outputting a signal corresponding to the result of the comparison;

a pair of start address storing means respectively connected to said match circuits, each of the start address storing means storing the start addresses of said two contents stored in said RAM, and outputting the start address stored therein when the match circuit connected thereto outputs a match signal indicating an address match as a result of the comparison;

op code storing means for storing an op code of a jump instruction for jumping from the program in said ROM to one of said altered contents stored in said RAM, said op code storing means outputting said op code when the match signal is outputted from one of said match circuits; and connection control means connected to said match circuits, the connection control means connecting said ROM to the data bus and disconnecting said op code storing means and said start address storing means from the data bus when none of said match circuits outputs the match signal, and when one of the match circuits outputs the match signal, the connection control means disconnecting said ROM from the data bus and connecting said op code storing means and the start address storing means supplied with said match signal from said one match circuit to the data bus to output the op code and said start address which is an operand of the jump instruction on the data bus, wherein the CPU executing said ROM program reads said jump instruction op code and said start address of the RAM outputted on the data bus, jumps to said start address from said ROM program, and executes said altered content from said start address, wherein said pair of start address storing means and said op code storing means are in areas of the ROM, and further comprising a decoder for decoding the outputs of said match circuits to ROM addresses, and means for controlling the output timing of said jump instruction op code and said start address from said ROM to said data bus, responsive to the input of the match signal from said match circuits.

2. A microcomputer in which a CPU outputs an address to an address bus, reads program data via a data bus from a memory of said address, and executes a program, comprising:

a ROM for storing said program executed by the CPU;

two address registers for storing the addresses of two locations in said ROM at which the stored contents are to be altered;

a RAM for storing the altered content at each of the two locations;

two match circuits respectively connected to said address registers, each of the match circuits comparing the address outputted from the CPU to the address bus and the addresses stored in said address registers, and outputting a signal corresponding to the result of the comparison;

a pair of start address storing means respectively connected to said match circuits, each of the start address storing means storing the start addresses of said two contents stored in said RAM, and outputting the start address stored therein when the match circuit connected thereto outputs a match signal indicating an address match as a result of the comparison;

op code storing means for storing an op code of a jump instruction for jumping from the program in said ROM to one of said altered contents stored in said RAM, said op code storing means outputting said op code when the match signal is outputted from one of said match circuits;

connection control means connected to said match circuits, the connection control means connecting said ROM to the data bus and disconnecting said op code storing means and said start address storing means from the data bus when none of said match circuits outputs the match signal, and when one of the match circuits outputs the match signal, the connection control means disconnecting said ROM from the data bus and connecting said op code storing means and the start address storing means supplied with said match signal from said one match circuit to the data bus to output the op code and said start address which is an operand of the jump instruction on the data bus, wherein the CPU executing said ROM program reads said jump instruction op code and said start address of the RAM outputted on the data bus, jumps to said start address from said ROM program, and executes said altered content from said start address; and means for storing a permission flag connected to said match circuits, the means for storing a permission flag applying the match signal from said match circuits to said connection control means so as to permit the alteration of the ROM program when the permission flag is a first value, and stopping applying the match signal from said match circuits to said connection control means so as to prohibit the alteration of the ROM program when the permission flag is a second value.

3. A microcomputer according to claim 2, wherein said permission flag storing means is a write enable memory.

4. A microcomputer in which a CPU outputs an address on an address bus and reads program data via a data bus from a memory of said address, to execute a program, comprising:

a ROM for storing said program executed by the CPU;

two address registers for storing the addresses of two locations in said ROM at which the stored contents are to be altered;

two match circuits respectively connected to said address registers, each of the match circuits comparing the address outputted from the CPU to the address bus and the addresses stored in said address registers, and outputting a signal corresponding to the result of the comparison;

means, connected to said match circuits, for storing a match flag indicating which of the addresses stored in said two address registers matches the address outputted to the address bus, a value of said match flag being set circuits;

a RAM for storing the altered contents at said two locations, and also storing an instruction to read the value of said match flag and a group of instructions for branching to one or the other of said two altered contents in accordance with the value of said match flag read by the instruction;

start address storing means for storing the start address in said RAM, and outputting said start address;

op code storing means for storing an op code of a jump instruction for jumping from the program in said ROM to said start address in said RAM, and for outputting said op code; and connection control means connected to said match circuits, the connection control means connecting said ROM to the data bus and disconnecting said op code storing means and said start address storing means from the data bus when none of said match circuits outputs the match signal, and when one of said match circuits outputs the match signal, and when one of said match circuits outputs the match signal of the level indicating an address match as a result of the comparison, the connection control means disconnecting said ROM from the data bus and connecting said op code storing means and the start address storing means supplied with said match signal from said one match circuit to the data bus to output the op code of the jump instruction and said start address which is an operand of the jump instruction on the data bus;

wherein while executing said ROM program, the CPU reads both said jump instruction op code and said start address outputted to the data bus, and executes the altered contents corresponding to the flag value after jumping to said start address from said ROM program and reading said flag.

5. A microcomputer according to claim 4, wherein each of said start address storage means is a write enable register.

6. A microcomputer according to claim 4, wherein said start address storing means and said op code storing means are in areas of the ROM, and further comprising a decoder for decoding the outputs of said match circuits to the ROM addresses, and means for controlling the output timing of said jump instruction op code and said start address from said ROM to said data bus, responsive to the input of the match signal from said match circuits.

7. A microcomputer according to claim 4, further comprising means for storing a permission flag connected to said match circuits, the means for storing a permission flag applying the match signal from said match circuits to said connection control means so as to permit the alteration of the ROM program when the permission flag is a first value, and stopping applying the match signal from said match circuits to said connection control means so as to prohibit the alteration of the ROM program when the permission flag is a second value.

8. A microcomputer according to claim 7, wherein said permission flag storing means is a write enable memory.

* * * * *